G. R. PARANTEAU.
CONVEYER FOR FRUIT.
APPLICATION FILED MAR. 16, 1921.
1,429,093.
Patented Sept. 12, 1922.
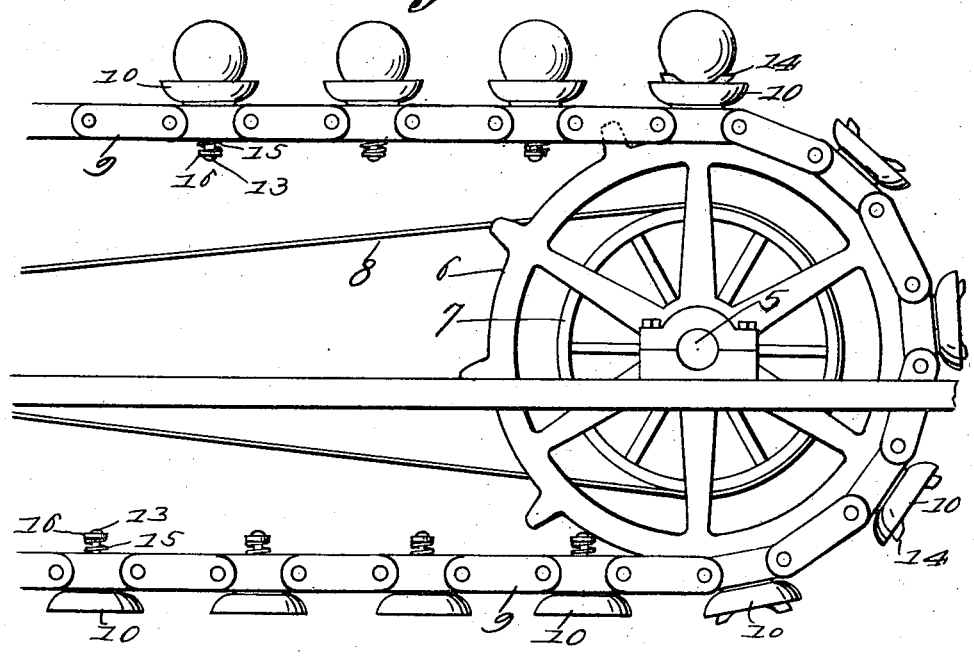
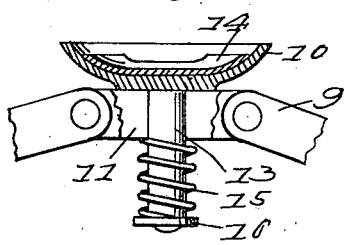
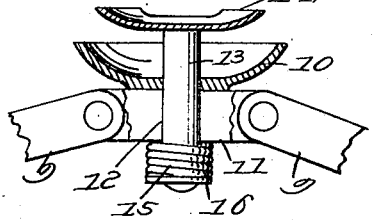
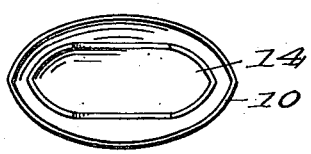

Patented Sept. 12, 1922.

1,429,093

UNITED STATES PATENT OFFICE.

GEORGE R. PARANTEAU, OF VENTURA, CALIFORNIA.

CONVEYER FOR FRUIT.

Application filed March 16, 1921. Serial No. 452,872.

*To all whom it may concern:*

Be it known that I, GEORGE R. PARANTEAU, a citizen of the United States of America, and resident of Ventura, in the county of Ventura and State of California, have invented certain new and useful Improvements in Conveyers for Fruit, of which the following is a specification.

This invention relates to conveyers for fruit and particularly to conveyers used in connection with fruit pitting machines in which the individual fruit is held while being pitted, it being an object of this invention to produce novel means for presenting the fruit one at a time to the fruit holders employed while the fruit is being pitted.

It is furthermore an object of this invention to produce a fruit carrier having means for insuring against the dislodgment of fruit from the carrying cups during normal operation, and having means for presenting the fruit to the grippers which carry it during the pitting operation so that the said grippers may more effectually engage the fruit without liability of injuring same.

A still further object of this invention is to produce an automatically controlled device in which the fruit is lifted from the cup at a predetermined position, it being the intention of the inventor that the fruit carriers of the pitting machine shall operate in the locality where the fruit is lifted from the cup.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of a conveyer embodying the invention;

Figure 2 illustrates a sectional view of one of the cups and parts associated therewith;

Figure 3 illustrates a similar view with the parts in different positions of adjustment; and Figure 4 illustrates a plan view of the cup.

It is belived sufficient for an understanding by one skilled in the art to show the conveyer and explain that the fruit is to be carried in juxtaposition to a fruit pitting machine in order that the fruit may be removed from the carrier one at a time. To that end, I have shown a fragment of the conveyer having a shaft 5 carrying a sprocket wheel 6 and a pulley 7 engaged by a belt 8 by which the conveyer is driven. The parts just described might be said to be conventional showings which can be modified to suit particular requirements as to the manner of applying power and mounting the conveyer.

The sprocket wheel 6 is engaged by a sprocket conveyer chain 9 certain links of which have the fruit carrying elements mounted on it. As these fruit carrying elements may be increased and diminished in number per yard of conveyer chain and as the fruit carrying elements may be located several links apart, I do not wish to be restricted with respect to the number employed. The illustration, however, is believed sufficient to enable one skilled in the art to practice the invention, especially when taken in conjunction with the following description.

The fruit carrying elements each comprise a cup 10 carried by certain of the links such as 11 of the chain. The links which carry the cups have apertures 12 therein through each of which a shank 13 of a supplemental cup 14 is slidable, the said supplemental cup being of less area than the cup 10 and it is intended to lie normally on the bottom of the cup 10. A spring 15 encircles the shank between the link 11 and a washer or collar 16 at the end of the shank, the said spring being effective to hold the supplemental cup normally in the position shown in Fig. 2 when the fruit lies in the larger cup and can be carried without liability of its being dislodged therefrom. The length of the conveyer, however great it may be, within predetermined bounds will operate as a fruit carrier, one piece being lodged in each cup. As shown, the shank of each cup normally projects well below the chain, but when the chain engages the sprocket wheel, the said sprocket wheel forms an abutment against which the shanks impinge and the said shanks are therefore projected through the links carrying the supplemental cups to the elevated position shown in Fig. 1 where the fruit is quite clear of the cup 10 and in position to be grasped by fruit holders of the pitting machine. The supplemental cups will be held in the position to which they are forced by the initial contact of the shanks with the wheel until the sprocket chain disengages the wheel and thereafter the supplemental cups regain their normal position under the influence of the springs.

As shown in the drawing, each cup 10 is elongated and has curved sides whereas the supplemental cup is of the general configuration of the cup 10 but it has its side edges cut away to form clearances for the fruit engaging grapples or fingers of a fruit holder of a fruit pitting machine.

I claim:

1. In a fruit conveyer, a sprocket chain, a sprocket wheel over which the chain is run, cups carried by links of the chain, a supplemental cup having its sides omitted in each of the first mentioned cups, the said first mentioned cups and links having apertures therein, shanks on the supplemental cups extending through the apertures of the first mentioned cups and links, and means for holding the inner ends of the shanks normally inside of the inner surfaces of the links.

2. In a fruit conveyer, a sprocket wheel having means for its rotation, a sprocket chain thereon, cups on links of the sprocket chain, the said cups and links having apertures, a supplemental cup having its sides omitted in each first mentioned cup, a shank on each supplemental cup projecting through an aperture of a first mentioned cup and a link, a spring encircling the shank near the inner end, the said spring bearing against a link, and means on the shank bearing against the opposite end of each spring for holding it under tension.

3. In a conveyer for fruit, a sprocket chain, a sprocket wheel on which the chain is mounted, an elongated cup having curved edges, a supplemental cup of the general contour of the first mentioned cup having its side edges removed, a shank on each supplemental cup projecting through a first mentioned cup and a link, the end of the said shank being adapted to be engaged by the sprocket wheel between the teeth of the said wheel for projecting the supplemental cup, and means for holding the shank in normal position.

GEORGE R. PARANTEAU.